Oct. 7, 1958   R. L. DORT   2,854,803
MOUNTING MEANS FOR TRACTOR MOUNTABLE MOWER
Filed May 28, 1956   4 Sheets-Sheet 2

*INVENTOR.*
R. L. DORT

Oct. 7, 1958   R. L. DORT   2,854,803
MOUNTING MEANS FOR TRACTOR MOUNTABLE MOWER
Filed May 28, 1956   4 Sheets-Sheet 4

INVENTOR.
R. L. DORT

United States Patent Office 2,854,803
Patented Oct. 7, 1958

2,854,803
MOUNTING MEANS FOR TRACTOR MOUNTABLE MOWER

Russell L. Dort, Davenport, Iowa, assignor, by mesne assignments, to Deere & Company, a corporation of Delaware Application May 28, 1956, Serial No. 587,678

23 Claims. (Cl. 56—25)

This invention relates to an agricultural implement and more particularly to a tractor-mounted or tractor-drawn implement. Still more particularly, the invention relates to draft and lift means for such implement.

The increasing popularity of the so-called three-point hitch tractor has presented not only the problem of designing implements for such tractors but has developed as a corollary the problem of adapting the newly designed implement to tractors not equipped with the three-point hitch.

A typical three-point hitch tractor includes combined lift and draft structure at its rear end, this structure conventionally including a pair of lower draft links, an upper hitch member and a power lift device on the tractor connected by lift links to the draft links for raising and lowering the latter. The draft links lend themselves very well to the mounting thereon of a variety of implements, and each implement will include a mast connected by a top link to the upper hitch member. Hence, vertical movement of the implement will be generally in the nature of vertical adjustment of a substantially parallelogram structure. The power lift device has a transverse rockshaft from which one or more lift arms project rearwardly for connection to the draft links and the power lift device is operable through a predetermined angular range and consequently vertical movement of the draft links will be in accordance with this range. There are, however, certain implements that cannot utilize all of this range, because to do so would require a substantial vertical distance between lowered or operating position and raised or transport position, with consequent adverse effects on the power shafting by means of which the implement is driven from the tractor. Various efforts to overcome this problem have heretofore been expended, such as by means including the provision of lost-motion between the implement and the draft and lift structure. However, such means has introduced unexpected complications in design and maintenance. These problems are especially accentuated in the adaptation to the tractor of a mower, the main part of which normally comprises a housing or support containing the drive mechanism receiving power from the tractor power take-off shaft. This part also supports the cutting mechanism which should be vertically adjustable relative to the main mower part. If it is desirable to use the draft and lift structure for accomplishing vertical adjustment of the cutter bar, that result should be achieved without effecting a material disparity in the vertical position of the mower, except when the mower is adjusted to a clear transport position. In other implements, it may be desired to maintain the vertical position of one part while using the power lift to adjust another part relatively; and in still other instances it may be expedient to use the lift means to effect shifting of one part horizontally and the other part vertically. According to the present invention, novel and desirable results are achieved by the provision of means mounting the mower or a similar implement on the draft and lift structure in such manner that the movement of the implement is through a range at a rate, and even in a direction different from those of the draft links, whereby the range, rate and direction differential may be utilized to transmit force for adjusting an implement part, such as cutting mechanism, for example, relative to the main implement frame or carrier.

The invention further features the utilization of the above principles in the adaptation of an implement design for use with an older style tractor not equipped with a three-point hitch. Other features of the invention reside in the provision of an improved, novel and simple design of mower, a mower or similar implement which is so designed as to accommodate the lift and hitch structures of a considerable variety of tractors. Still further features reside in means for interlocking the implement frame and draft and lift structure against downward movement beyond a predetermined point, in addition to means establishing a transverse interlock to lock out the draft links against side sway.

The foregoing and other important objects and desirable feature will become apparent as preferred embodiments of the invention are disclosed in detail in the ensuing specification and accompanying sheets of drawings, the several figures of which will be described immediately below.

A tractor having a longitudinal body 10 carried on right and left hand traction wheels 12 and 13 is selected as typical of a mobile support for carrying the draft structure and implement or mower to be presently described. The tractor shown in that form of the invention illustrated in Figs. 1 through 6 may be of any commercially known type including in its body 10 a transverse rear axle structure 14 having at opposite outer ends thereof right and left hand depending housings 16 and 17, which housings at lower portions thereof afford hitch means including ball joint connections 18 and 19, respectively, which are transversely alined on what may be termed a first pivot axis, hereinafter identified as the axis 18—19. The tractor is customarily equipped with a power lift device of any suitable construction, designated generally by the numeral 20 and including a transverse rockshaft 22, suitably powered by hydraulic means not shown and having rigidly secured thereto in laterally spaced relation right and left hand lift arms 24 and 25.

The components of the lift device, together with right and left hand draft links 26 and 27 and lift links 28 and 29, establish a combined draft and lift or hitch and lift structure referred to in its entirety by the letter D. The links 28 and 29 constitute means connecting the draft links to the lift device via the arms 24 and 25, the lower end of the link 28 being pivotally connected to the draft link 26 at 30 and the upper end being pivotally connected to the lift arm 24 at 32. Pivotal connections at 31 and 33 accomplish a similar result relative to the lower and upper ends of the left hand lift link 29. The pivotal connections 30 and 31 are of course transversely alined and the pivotal connections 32 and 33 are transversely alined on an axis above the pivots 30 and 31 and behind the axis established by the rockshaft 22. The front ends of the draft links are connected to the tractor on the hitch means axis 18—19. It will therefore be seen that the relationship of the several axes 22, 32—33, 30—31 and 18—19 establishes generally a dual parallelogram of which the lower sides are formed by the draft links 26 and 27. The draft link 26 has a free rear end established by a mounting pintle 34, which is transversely alined with a similar mounting pintle 35 for the rear end of the left hand draft link 27.

In addition to the foregoing, the structure D includes an upper hitch member 36 on the tractor, which affords an upper front connecting portion comprising a transverse pivot pin 38 for achieving another pivot axis, which axis is above the axis 18—19. The pintles 34 and 35 and the pivot pin 38 afford three hitch points, from which the structure derives its designation as a three-point hitch.

An additional part of the mobile support or tractor itself is a typical rearwardly extending power take-off shaft 40.

The implement shown here is a mower, it being understood that there is novelty in the implement broadly as well as in the mower specifically. The independent attributes of each will become apparent as the description progresses. In either case, the implement is provided as an attachment, in this form of the invention, adapted for mounting on the draft and lift structure D. For purposes of general identification, the implement is designated by the letter M.

Figures 3, 4:
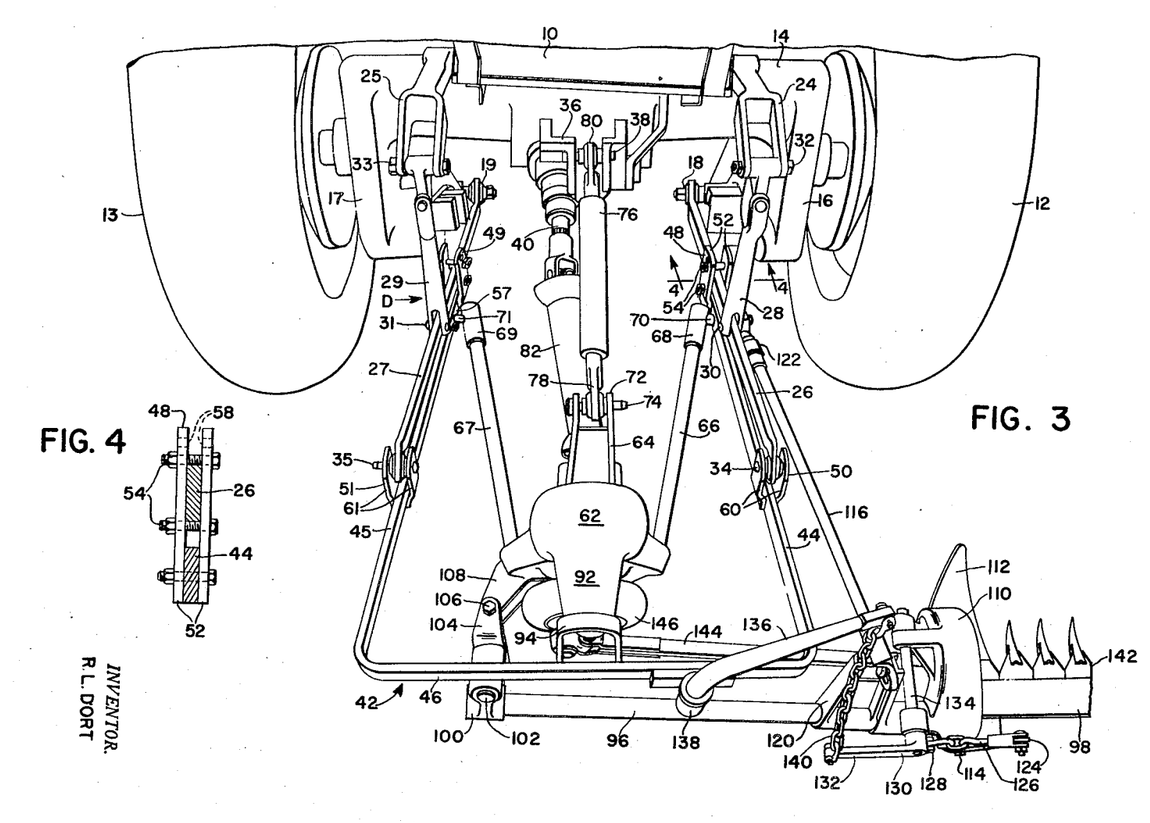
Fig. 3 is a rear perspective, on a scale enlarged over that of Figs. 1 and 2, showing the tractor and mower relationship.
Fig. 4 is an enlarged sectional view as seen generally along the line 4—4 of Fig. 3.

The main part or base frame of the implement is in the form of a bail or a U-shaped carrier 42, which frame or carrier is made up of right and left hand fore-and-aft extending legs 44 and 45 and a transverse rear bight 46 that rigidly cross-connects the rear ends of the legs 44 and 45. The bail or carrier 42 is positioned with its legs 44 and 45 respectively along the draft links 26 and 27 and the carrier is mounted on the draft links by right and left hand front means 48 and 49 and right and left hand rear means 50 and 51. As best shown in Fig. 4, the right hand front means or bracket 48 comprises a pair of closely spaced apart upright plates 52, suitably apertured to receive a plurality of fastening means in the form of bolts and nuts 54, the lower of the bolts passing directly through the front end 56 of the bail leg 44 and the two uppermost bolts straddling a portion of the right hand draft link 26 intermediate the pivots 18 and 30. Additional apertures, as at 58, in the plates 52 are provided to accommodate draft links of different vertical dimension. Since the left hand means 49 is symmetrical as respects that just described, elaboration is deemed to be superfluous. The right hand rear bracket or means 50 comprises a pair of transversely spaced apart plates 60 apertured in transverse register to receive the rear end pintle 34 on the right hand draft link 26. A pair of plates 61, constructed similarly to the plates 60, constitute the left hand rear means or bracket 51, the mounting being accomplished by the left hand draft link pintle 35 (Fig. 3).

From the description thus far, it will be seen that the bail or carrier extends generally fore-and-aft, as well as laterally, and is mounted on and sustained by the draft structure D, particularly via the draft links 26 and 27, by the means 48, 49, 50 and 51. To all extents and purposes, the carrier or frame 42 becomes therefore part of the draft structure 26 and 27, at least functionally and consequently the reference to the draft links and frame or carrier 42, in an integrated sense, is supported by the functional relationship of the two, which is of significance in the subsequent description of the modified form of the invention in Figs. 7 and 8.

In the adaptation of the base frame or carrier 42 to the draft structure D of a three-point hitch tractor, various considerations must be kept in mind. For example, the carrier 42 has a rearward extent in excess of that of the draft links 26 and 27 and therefore provides a simple and economical expedient of increasing the overall length of the draft structure D. At the same time, the pintles 34 and 35 of the draft structure, commonly employed for mounting other implements, are similarly employed in mounting the intermediate portion of the carrier 42 via the brackets or means 50 and 51. Since the plates of the front means 48 and 49 are adapted to accommodate draft links of different dimensions, these means provide ready attaching elements for supporting the forward ends of the legs 44 and 45 of the carrier, it being understood that the forward end 57 of the left hand leg 45 is connected to a forward portion of the left hand link 27 via the means 49 already described.

Figure 5:
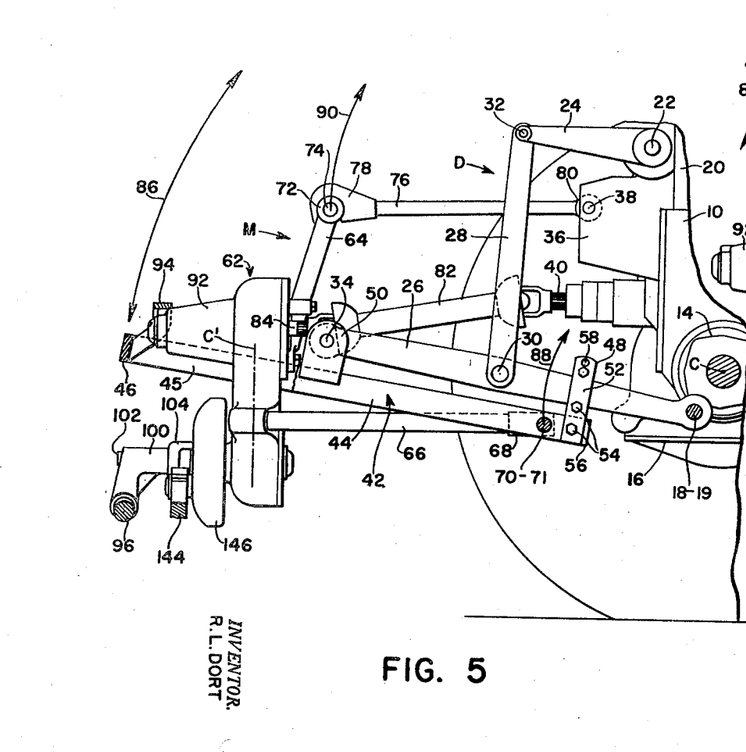
Fig. 5 is an elevation, with portions omitted, and illustrating the operating positions of the components of the machine.
Figure 6:
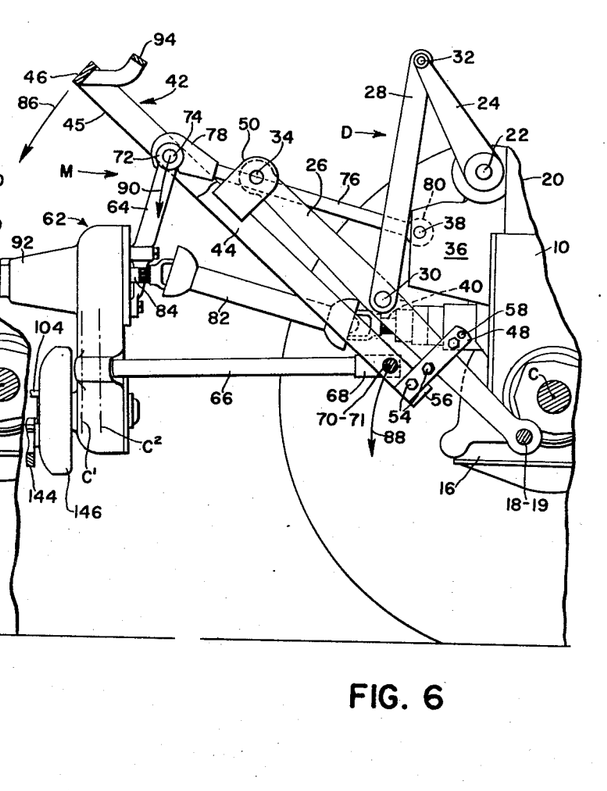
Fig. 6 is an elevation showing the raised or transport positions of the components of the machine.

Inasmuch as the carrier 42 is functionally integrated with the draft structure D, it will rise and fall or be raised and lowered according to raising and lowering of the draft structure by means of the power lift device 20, the carrier thus moving arcuately about the transverse pivot 18—19 and the rear end or bight 46 thereof thus moving through an arcuate range represented primarily by the difference between the positions of the carrier 42 in Figs. 5 and 6. This range is, of course, determined by the range of arcuate movement of the lift arms 24 and 25 and the geometry involved in the connections of these arms by the lift links 28 and 29 to the draft links 26 and 27. As previously described, the pivot connections providing the hitch axis at 18 and 19 involve ball joints, which is conventional. Normally, when the draft links 26 and 27 support a tillage implement, a certain amount of side sway or lateral movement occurs. In implements of the type shown here, for example, it is desirable that this side sway be eliminated. The transverse rigidity of the carrier 42, as afforded primarily by the bight 46, serves to some extent to cancel the side sway, since the carrier 42, via the bight 46, cross-connects the links 26 and 27. Further means for eliminating the side sway will be described below.

The foregoing has established that the tractor is a mobile support having the lift device 20 and the hitch means 16—17, including the hitch axis 18—19, which is below the lift device 20. The carrier 42, when considered as intergrated with the draft links 26—27 (Figs. 1-6), has its front end 56—57 pivotally connected to the tractor on a first transverse pivot 18—19 and by means of its connecting means 28—29 to the lift device 20, via the arms 24—25 and rockshaft 22, is capable of raising and lowering movement under the influence of the power lift device. The rear end of the carrier, as represented by the bight 46, moves through a substantial vertical range, as represented by the difference between the positions of the carrier in Figs. 5 and 6, as already described. As will be brought out below, further components of the implement or mower are arranged relative to the carrier so as to utilize the power lift device not only to raise and lower part of the implement but also to adjust another part thereof.

As contributing toward the above purposes, the implement includes a main frame, here in the form of a mower housing 62 of rigid substantially upright nature, including rigidly thereon a mast 64 and right and left hand forwardly diverging rigid arms 66 and 67. As viewed in side elevation (Figs. 5 and 6), the structure just described affords a substantially rigid L, of which the arms 66 and 67 provide the lower arm means and the housing itself and its rigidly attached mast 64 establish the upright arm means. The diverging arms or braces 66 and 67 respectively have free front ends 68 and 69 respectively proximate to the front ends 56 and 57 of the carrier legs 44 and 45 and consequently proximate to the pivot or hitch axis 18—19. In the present embodiment the front ends 68 and 69 of the arms are in rearwardly offset relationship to the hitch axis 18—19, which affords a transverse first pivot axis, and these free front ends are pivotally connected respectively to the front ends of the carrier legs by means including transversely alined pivot members 70 and 71 which establish a second pivot axis, hereinafter referred to as the axis 70—71, and which axis is eccentric to—here spaced rearwardly from—the axis 18—19. The front end of the implement or mower frame is thus connected to the draft structure D for vertical movement therewith, as will be obvious from the difference in height of the member or pivot 70 as between Figs. 5 and 6, but the amount of fore-and-aft movement will be relatively small, depending upon the radius of the arc of swing. At this point, it should be noted that the amount and direction of eccentricity of the pivot axis 70—71 relative to the pivot axis 18—19 are factors in the amount and direction of movement of the front end of the mower frame. If the amount of eccentricity is zero, there will be no movement. If the direction of eccentricity places the axis 70—71 below the axis 18—19, the direction of movement will be mainly fore-and-aft, but the amount of vertical movement will be relatively small, depending upon the radius of the arc of swing. Thus, within the principles of this invention, a variety of results may be achieved. In the embodiments illustrated, vertical movement of the mower frame to a certain extent is desired. Hence the rearward eccentricity of the axis 70—71 as respects the axis 18—19.

Regardless of the foregoing, the mower housing requires some other connection between it and the tractor so that the rear end of the mower housing does not drop to the ground. The accomplishment of this connection is effected between the mast 64 and the upper hitch member or upper front connecting portion 36—38 on the tractor. To this end, the upper end of the mast 64 affords an upper rear connecting portion 72 which includes a transverse pivot 74 which affords a third pivot axis in addition to the axes 18—19 and 70—71. The pivot 38, previously described in connection with the mounting portion or hitch member 36 affords a fourth pivot axis. Fore-and-aft link means in the form of a single top link 76 has its rear end 78 connected to the upper rear connecting portion 72 via the pivot 74 and has its front end 80 pivotally connected to the upper hitch member or front mounting portion 36 via the pivot member 38.

Figures 5 and 6 best illustrate the triangular relationship of the axes 70—71, 38 and 74, it being noted that the distance between the axes 38 and 70—71 varies according to the vertical position of the draft structure D and carrier 42. That is to say, the maximum distance, according to the present construction, is afforded by the positions of the parts in Fig. 5, which corresponds to the operating position of the mower frame or housing 62. The raised or transport position is illustrated in Fig. 6, wherein it will be seen that the axis 70—71 has moved upwardly and is therefore closer to the axis 38. Stated otherwise, the vertical range of the carrier 42 is substantial, whereas the vertical range of movement of the mower housing 62 is relatively little. This will be apparent by a comparison of the positions of the involved parts as respects Figs. 5 and 6. By means of this construction and arrangement, the lift device may be operated through its maximum range while effecting movement of the mower housing 62 through a smaller range and at a slower rate, a result that has many advantages. In the first place, since the mower housing 62 is not connected directly to the rear end of the carrier 42 and therefore does not move through the substantial range, the position of the mower housing relative to the tractor power take-off shaft 40 is consonant with the elimination of extreme angles in a power transmitting shaft 82 between the power take-off shaft 40 and an input shaft 84 for the mower housing 62. From the standpoint of simple mower characteristics, it is undesirable for other reasons to elevate the mower housing more than is necessary, which would otherwise have adverse effects on the cutting mechanism, as will presently appear. Stated briefly, the mower housing structure 62—66—67, constitutes an L-shaped element vertically movable in response to the generally parallelogram draft structure D but through a smaller range and at a slower rate, thereby not only achieving relatively slight changes in the vertical position of the mower housing but also making available for other uses the rate and range differential between the two structures. As indicated previously, the movement characteristics of the mower housing are functions of the location of the axis 70—71 as respects the axis 18—19. If these axes are made coincident, the mower housing has no movement and since that housing is a rigid L it would have a two-point connection to the tractor, one at 38 and the other at 70—71, here hypothetically coincident with 18—19.

In the actual structure disclosed, however, as the draft structure D moves vertically about its axis 18—19, the bight 46 of the carrier describes an arc 86 and the axis 70—71 moves through an arc 88, both about the axis 18—19. The pivot point or axis 74 describes an arc 90 about the pivot point or axis 38. Consequently, vertical movement of the mower housing will be substantially translatory and will shift but little in a fore-and-aft direction, which will be apparent by comparing the distance between the center line C of the tractor axle and the center line C¹ of the mower housing in Fig. 5 with the distance between the axle center line C and the mower housing center line C² in Fig. 6, in which latter figure the Fig. 5 mower housing center line C¹ has been drawn in for purposes of the comparison.

From the foregoing, it will be evident that as the mower housing 62 moves downwardly from its position of Fig. 6 it also moves slightly rearwardly (the difference between C² and C¹). It will also be evident that as the carrier 42 approaches a horizontal position, its extent of rearward movement will be negligible. As a matter of fact, it will be appreciated that should the carrier 42 pass below its horizontal position, it will be in a different quadrant and therefore the bight 46 will begin to move forwardly. It is a feature of this invention that advantage is taken of the difference in movement of the carrier 42 and mower housing 62 to establish an interlock preventing further downward movement of the two while enabling relative upward movement. The interlock is achieved by stop means including a stop or stop element 92 on the mower housing 62 and a stop or stop element 94 on the bight 46 of the carrier 42. The stop 92 is preferably an integral rearwardly extending part of the mower housing 62 in the form of a truncated cone. The stop 94 is a loop or inverted stirrup. The arrangement is such that when the parts reach the position that they occupy in Fig. 5, the upper part of the loop or stirrup engages the upper part of the stop portion 92 on the mower housing 62 and downward movement of all parts ceases. This result follows from the interlock at 92—94 because unless the parts 42 and 62 can move relatively, they cannot move at all. If part 42 cannot move, the pivot axis 70—71 cannot move. The mower housing 62 cannot pivot about the now stationary pivot 70—71 because it is restrained by the link 76. Since the interlock is of the one-way type—effective downwardly only—upward movement of the parts is permitted. In view of the effectiveness of the link 76 in preventing pivoting of the housing 62 downwardly about the now fixed axis 70—71, it follows that adjustment of the length of this link will vary the height at which the interlock at 92—94 becomes effective.

The interlock is advantageous from the standpoint of operation, since the operator may control the power lift device 20 in such a manner as to accomplish full lowering, knowing that the stop means 92—94 will operate at the proper time. Another feature of the stop means 92—94 is that a lateral interlock is also established, which will be apparent from Fig. 3. That is to say, the loop shape of the stirrup 94 embraces the truncated cone of the stop 92 so that the two become engaged against relative lateral displacement. This lateral interlock, combined with the bracing effect of the mower housing arms 66 and 67 further contributes to the lateral rigidity of the entire structure.

Considering the mower housing 62 as an implement frame or part, it will be seen that it carries an implement member, here represented by a transverse drag bar 96 and cutting mechanism 98. The left hand end of the drag bar 96 is carried in a support 100 which is pivotally connected on a fore-and-aft axis at 102 to a bracket 104 which in turn is pivoted on a vertical axis at 106 to a supporting arm 108 rigid on the mower housing 62. Consequently, the drag bar 96 is capable of vertical movement as well as horizontal movement relative to the mower frame structure 62—66—67, the horizontal movement being confined, as will be brought out below, except in cases of abnormal situations.

The drag bar 96 and cutter bar 98 are interconnected, as is conventional, by a yoke 110 and inner shoe 112, the yoke being secured to the outer end or right hand end of the drag bar and being pivotally connected to the shoe 112 by fore-and-aft alined pivots 114. As far as concerns horizontal movement of the drag bar 96 and cutter bar 98 relative to the mower housing 62, the two may be considered as one, particularly with respect to the ability of the two to swing rearwardly about the inner upright pivot axis at 106. In normal operation, rearward swinging is prevented by a telescopic releasable pull link 116, which link is connected at its rear end at 118 to a rigid arm portion 120 on the outer end of the drag bar 96, the forward end of the link means 116 being connected at 122 to the front end portion 56 of the right hand leg 44 of the carrier 42 of the right hand pivot 70. The releasable link 116 forms no part of the present invention and therefore is not further described. It will be understood that during normal operating conditions, the link 116 has the length shown primarily in Figs. 1, 2 and 3. However, if the cutter bar 96 strikes an obstruction sufficient to release the latch on the link 116, the telescopic parts of the link may extend so that the cutter bar may swing rearwardly about the pivot 106, all of which is generally conventional.

Because of the fore-and-aft axes at 102 and 114, the cutter bar 98 is free, within limits, to rise and fall according to variations in ground contour. The pivot 114 also provides a pivot axis about which the cutter bar 98 may be tilted vertically relative to the drag bar and mower housing 62.

As described above, the range and rate differential as respects vertical movement of the structures D and 62—66—67 is utilized to effect adjustment of the cutter bar 98 vertically relative to the mower housing 62. For this purpose, the rear portion of the shoe 112 has rigid thereon an upstanding lever arm 124 which is connected by a link 126 to a short arm 128 of a bell crank 130 having a long arm 132 and being pivoted at 134 on the yoke 110 on a fore-and-aft axis. The arrangement is such that an upward force applied to the long arm 132 of the bell crank 130 swings the short arm 128 in a clockwise direction as viewed in Figs. 1 and 2, applying an inward force to the upper end of the shoe lever arm 124, thereby pivoting the cutter bar 98 about the fore-and-aft yoke-to-shoe axis 114. The means for applying an upward force to the bell crank arm 132 as just described is comprised by means interconnecting the cutting mechanism and the draft structure. Specifically, this means comprises an arm 136 carried by the bight 46 of the carrier 42 by means of an upright pivot socket 138, so that the arm 136 can swing rearwardly when the cutting mechanism swings rearwardly about the axis 106 upon the striking of an obstruction. The free end of the arm 136 is connected by a lift link, here a chain 140, to the long arm 132 of the bell crank 130.

Figure 1:
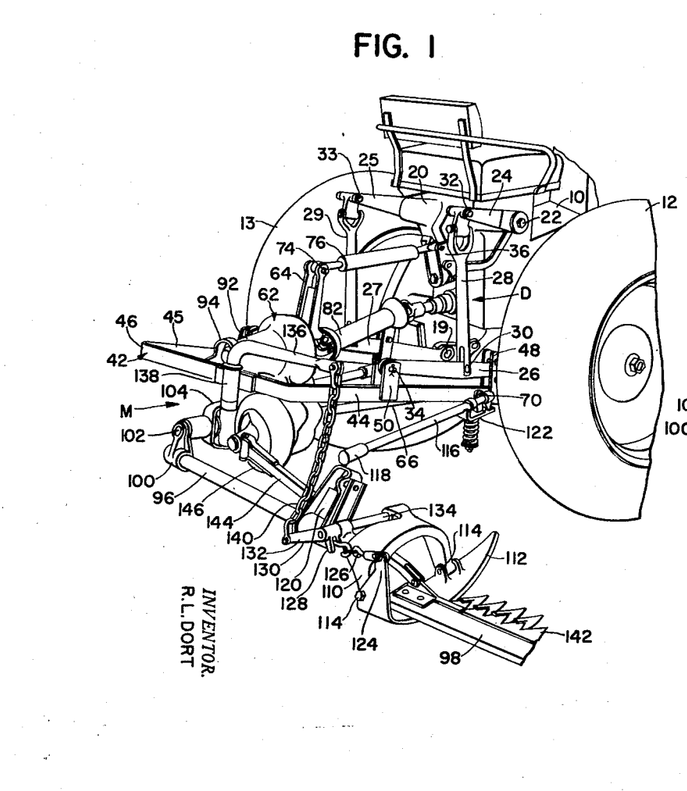
Fig. 1 is a fragmentary perspective of the rear part of a tractor-mounted mower, showing the cutting mechanism in operating position.
Figure 2:
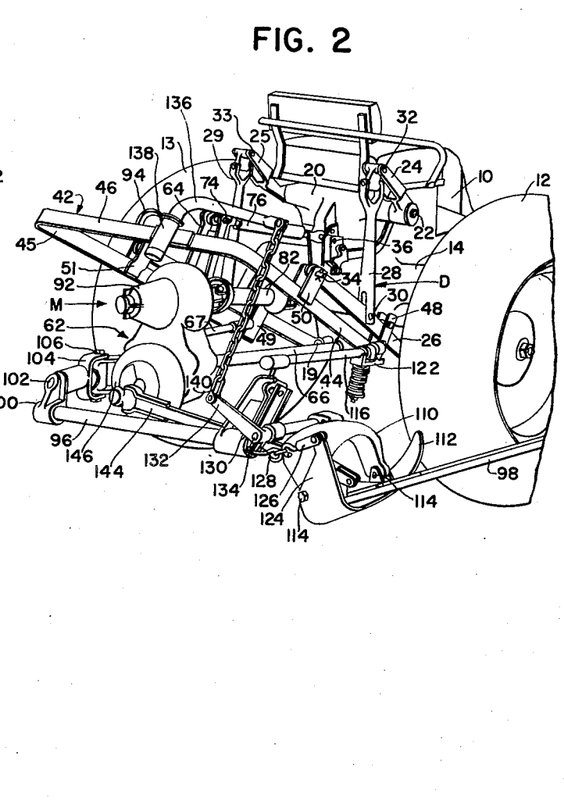
Fig. 2 is a similar view but showing the cutting mechanism tilted upwardly relative to the mower for general transport of the unit.

The manner of accomplishing upward swinging of the cutter bar 98 relative to the mower housing 62 may be observed by comparing Figs. 1 and 2. In the Fig. 1 position (which corresponds also to Fig. 5) the inner shoe 112 is riding the ground and the chain 140 is slack. Consequently, the cutting mechanism may have limited vertical movement as ground contour varies. When the carrier 42 is raised by the draft structure D, it moves, as aforesaid, through a greater range and at a greater rate than the mower housing 62. Since the lift arm 136 is mounted on the carrier, it will partake of maximum movement of the carrier and will therefore exert a lifting force on the cutting mechanism via the linkage and bell crank arrangement 130 etc. Since the cutting mechanism will then react to the movement of the carrier 42, whereas the mower housing 62 moves relatively slightly, the cutting mechanism will be adjusted vertically relative to the mower housing. At the same time, since the mower housing does move upwardly to some extent, the drag bar 96 will also move upwardly and the inner shoe 112 will clear the ground so that the position of Fig. 2 will serve as a transport position in circumstances such as involved in moving from field to field. It will be understood, of course, that the cutter bar 98 can be manually swung to an upright position, as is conventional, in which position it is locked by a suitable transport rod (not shown) for transport over substantial distances. The position of Fig. 2 also represents the position that the cutter bar 98 may be moved for raising the cutter bar over obstacles in the fields. Hence, the power lift device, which is not modified, may be utilized to accomplish all of the necessary results contributing to efficient mower operation. At the same time, it will be seen that the initial draft structure D on the tractor has likewise undergone no modifications in the adaptation thereto of the implement attachment represented by the carrier and mower housing 42 and component parts. In short, the novel design has taken advantage of existing structure on the tractor of the three-point hitch type.

Figure 7:
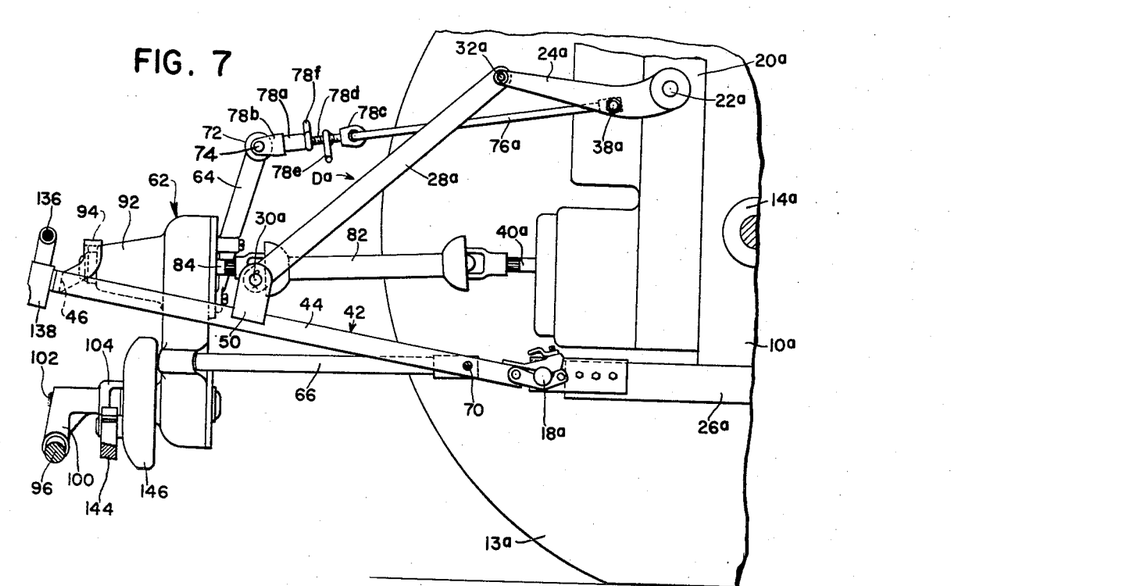
Fig. 7 is an elevation similar to Fig. 5 but showing a modified form of attachment for a different type of tractor.
Figure 8:
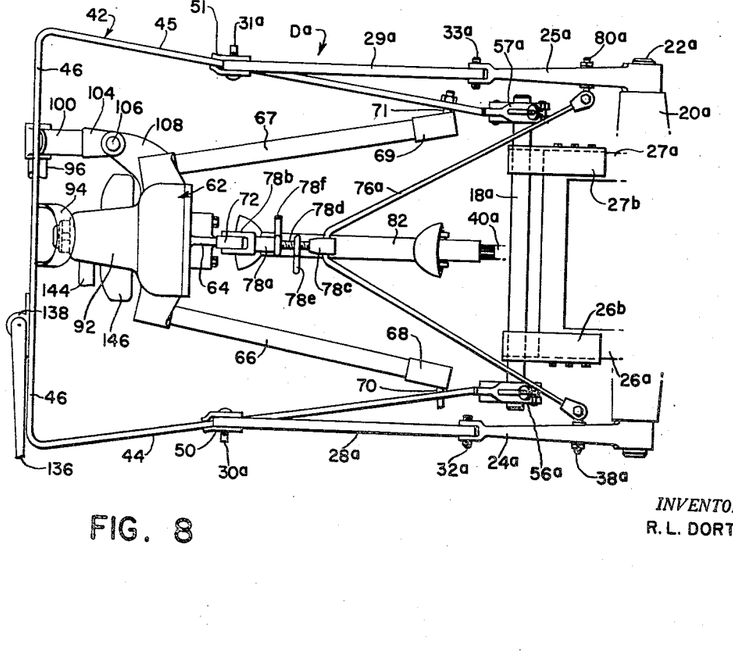
Fig. 8 is a top plan view of the structure shown in Fig. 7.

A further feature of the invention is to utilize the foregoing principles in the adaptation of a mower or implement to a tractor not equipped with a three-point hitch, which phase of the invention is illustrated in Figs. 7 and 8. The portion of the tractor there illustrated reveals a tractor body 10a having traction wheels, only the left hand one of which is visible at 13a. This tractor also includes axle structure 14a but does not have the depending housings 16 and 17 of the tractor in Figs. 1 through 6. However, any suitable hitch means affording a transverse pivot axis as at 18—19 in Figs. 1–6 will suffice and such is here provided, as will be brought out below. The tractor of Figs. 7 and 8 has a power lift device 20a which includes a transverse rockshaft 22a and right and left hand lift arms 24a and 25a.

Instead of the three-point hitch structure, this tractor has hitch means including a drawbar made up of right and left hand side members 26a and 27a to which are respectively attached adaptor brackets 26b and 27b. These brackets carry a transverse pivot shaft 18a on which the implement carrier 42 is mounted, the substantial identity between the carrier and related structure in Fig. 7 and that of Figs. 1 through 6 being readily recognizable. Accordingly, the same reference characters are used. In this case, however, the right and left legs 44 and 45 of the carrier 42 are modified at their front ends to provide attaching clamps 56a and 57a, whereby the carrier 42 is connected to the pivot shaft 18a for vertical swinging just as are the links 26 and 27 and carrier 42 in Figs. 1 through 6, for which purpose right and left hand lift links 28a and 29a are provided, these links being connected respectively at lower and upper ends to the sides of the carrier and to the lift arms 24a and 25a at pivotal connections, respectively, 30a, 31a, 32a and 33a. The draft structure in this case, designated in its entirety by the letters Da, is here represented by the components 24a—25a, 18a, 42 and 28a—29a, and this draft structure is vertically swingable through substantially the range of the carrier 42 in Figs. 1 through 6. The correspondence between the two modifications will be recognized from the previous consideration that in Figs. 1 through 6 the carrier 42, being mounted on the draft links 26 and 27, functionally constitutes a part of the draft links.

The implement or mower structure shown in Figs. 7 and 8 is identical to that previously described and accordingly includes the same parts, which are designated in the drawings without repetition of the specific description. One difference between the arrangement of Figs. 1 through 6 and that of Figs. 7 and 8, at least from the standpoint of illustrating the versatility of the implement or mower design, is demonstrated by the use of the mounting means 50 and 51 in Figs. 7 and 8 for connection to the lift links 28a and 29a. It will be understood of course that the structure of Figs. 7 and 8 includes the cutter bar 98 etc. and that the pull link 116, not shown in Figs. 7 and 8, is connected to the right hand leg 44 of the bail or carrier 42 at 70, which structure is omitted in Figs. 7 and 8. The propeller shaft 82 is used to connect the mower input shaft 84 and the tractor power take-off shaft 40a. Here, as in Figs. 1 through 6, there is a range and rate differential in the vertical movement of the structure Da as compared to the mower structure 62—66—67 etc. and the principles and outline of operation previously set forth apply here as well as there.

In place of the top link means 76 in Figs. 1 through 6, the modification of Figs. 7 through 8 uses fore-and-aft link means 76a, here a cable anchored at one end at 38a to the right hand lift arm 24, anchored at its other end at 80a to the left hand lift arm 25a and having its bight connected to the upper rear connecting portion 72 on the mast 64 by an adjustable connection 78a, the latter connection including the transverse pivot axis 74. The anchors 38a and 80a are the equivalent of the upper front connecting portion or hitch member 36, establishing what might be termed a transverse "floating" axis 38a—80a for the front end of the link means 76a, which axis is offset above the axis 18a just as is the axis 38 relative to the axis 18—19.

Adjustment of the link means 76a by the means 78a is accomplished by incorporating in the means 78a a first yoke 78b, a second yoke 78c and a threaded rod 78d interconnecting the two yokes by being threaded into the yoke 78b and rotatable in but non-axially shiftable in the yoke 78c. The yokes 78b and 78c are connected respectively to the mast 64 and to the link means 76a. Rigidly secured to the threaded rod 78d, as by welding, is an adjusting lever 78e which is capable of rotating the threaded rod into and out of the yoke 78b whenever a lock nut 78f is loosened.

To elaborate somewhat upon the relationship of the structure of Figs. 7 and 8 to that of Figs. 1 through 6, attention is called to the existing substantial parallelogram in Figs. 7 through 8, represented at its four corners by the points 22a, 32a, 30a and 18a. The rigid L is still afforded by the mower housing 62 and the arms 66 and 67, the critical points of which occur at 70—71, 74 and 38a—80a. It will be appreciated that upon raising of the carrier 42, the point 70 travels somewhat faster than the point 38a and therefore approaches the point 38a. Except for the difference that in Figs. 7 and 8 the points 38a and 80a move vertically and in Figs. 1 through 6 the point 38 is fixed, the two structures are substantially identical. The interlock 92—94 works the same in both forms of the invention. Likewise, selection of the pivot axis 70—71 relative to the pivot axis 18a, as respects the amount of direction of eccentricity (including zero eccentricity) is possible in the structure of Figs. 7 and 8.

In either case, the cutting mechanism 98 includes a typical reciprocating knife 142 driven by a pitman 144 and eccentric 146. These details form no part of the invention but are described merely as part of the mower structure.

Features of the invention not categorically enumerated will undoubtedly occur to those versed in the art, as will various modifications and alterations in the preferred embodiments shown, all of which may be achieved without departure from the spirit and scope of the invention.

What is claimed is:

1. An implement attachment for a mobile support having a lift device and hitch means below said device comprising: a fore-and-aft carrier having a front end pivotally connected to the hitch means on a first transverse pivot and further having a rear end; means connecting the carrier and the lift device for raising and lowering of the carrier by the device; an implement having a front end portion pivotally connected to the carrier on a second transverse pivot adjacent to and rearwardly of the first pivot whereby the front end of said implement is movable vertically with the carrier, said implement having an upper rear connecting portion rigidly related to the aforesaid front end portion and disposed rearwardly of and at a level above the second pivot; means carried by the mobile support and affording an upper front connecting portion; and fore-and-aft link means pivotally connected to said upper rear connecting portion on a third transverse pivot and pivotally connected to the mobile-support-carried front connecting portion on a fourth transverse pivot ahead of the third pivot and above the second pivot whereby the implement is moved vertically by the carrier but through a smaller range and at a slower rate than said carrier.

2. The invention defined in claim 1, including: an implement member carried by the implement for movement relative to said implement and means connected to the implement member and operative in response to raising of the carrier and utilizing the aforesaid differences in range and rate to move the member relative to the implement.

3. The invention defined in claim 1, in which: the lift device includes a vertically movable lift arm positioned above the first and second pivots and ahead of the third pivot, and the means connecting the carrier and the lift device is connected to said device via said arm; and the upper front connecting portion is included in said arm.

4. An implement attachment for a mobile support having a lift device and hitch means below said device comprising: a fore-and-aft carrier having a front end pivotally connected to the hitch means on a first transverse pivot and further having a rear end; means connecting the carrier and the lift device for raising and lowering of the carrier by the device; an implement frame affording a rigid L having fore-and-aft arm means and upright arm means, said fore-and-aft arm means having a front end portion pivotally connected to the carrier on a second transverse pivot adjacent to and rearwardly of the first pivot whereby the front end portion of said implement frame is movable vertically with the carrier, said upright arm means having an upper end portion providing an upper rear connecting portion rearwardly of and at a level above the second pivot; means carried by the mobile support and affording an upper front connecting portion; and fore-and-aft link means pivotally connected to said upper rear connecting portion on a third transverse pivot and pivotally connected to the mobile-support-carried front connecting portion on a fourth transverse pivot ahead of the third pivot and above the second pivot whereby the implement frame is moved vertically by the carrier but through a smaller range and at a slower rate than said carrier.

5. The invention defined in claim 4, including: an implement member carried by the implement frame for movement relative to said implement frame; and means connected to the implement member and operative in response to raising of the carrier and utilizing the aforesaid differences in range and rate to move the member relative to the implement frame.

6. An implement attachment for a mobile support having hitch means and a lift device above the hitch means and including a transverse rockshaft and a lift arm secured thereto, comprising: a fore-and-aft carrier pivotally connected to the hitch means on a first transverse pivot and having a rear end portion spaced from said pivot; an implement frame affording a rigid L having fore-and-aft arm means and upright arm means, said fore-and-aft arm means having a front end portion pivotally connected to the carrier on a second transverse pivot adjacent to and rearwardly of the first whereby the front end portion of said implement frame is movable vertically with the carrier, said upright arm means having an upper end portion providing an upper rear connecting portion rearwardly of the lift arm and above the rear end of the carrier; means on the lift arm providing an upper front connecting portion; and fore-and-aft link means pivotally connected to said upper rear connecting portion on a third transverse pivot and pivotally connected to the mobile-support-carried front connecting portion on a fourth transverse pivot ahead of the third pivot and above the second pivot whereby the implement frame is moved vertically by the carrier but through a smaller range and at a slower rate than said carrier.

7. A mower attachment for a tractor of the three-point hitch type having an upper hitch member and a pair of power-adjustable vertically swingable draft links including free rear ends and having their front ends pivotally connected to the tractor on a first transverse pivot below the upper hitch member, comprising: a U-shaped base frame having fore-and-aft legs positioned respectively generally along the draft links and further having a transverse rear bight cross-connecting the legs rearwardly of the rear ends of the draft links; means connecting the base frame to the draft links for bodily support of the former on the latter so that said base frame is vertically adjustable with the draft links; a mower frame including a housing positioned ahead of the base frame bight and including a mast rigid thereon in fore-and-aft alinement with the upper hitch member and further including rigidly thereon a pair of forwardly extending arms having free front ends adjacent to portions of the base frame legs rearwardly of the draft links pivot axis; means pivotally connecting the front ends of the arms to the base frame legs on a second transverse pivot rearwardly of the draft links pivot axis and below the upper hitch member; fore-and-aft link means pivotally connected at its rear end to the mast on a third transverse pivot and pivotally connected at its front end to the upper hitch member on a fourth transverse pivot above the second pivot, said mower frame housing being thus vertically movable by the base frame and draft links but through a smaller range and at a slower rate than the base frame when said base frame and the draft links are vertically adjusted; a cutter bar pivotally connected to the mower frame housing on a fore-and-aft axis for vertical swinging relative to said mower frame; and lift means connected between the cutter bar and the base frame at the bight of the latter and utilizing the aforesaid differences in range and rate to swing the cutter bar relative to the mower frame.

8. The invention defined in claim 7, including: stop means comprising stop elements respectively on the base and mower frames and interengageable upon predetermined downward movement of said frames to interlock said frames against further downward movement.

9. The invention defined in claim 8, in which: the stop elements include a portion rigid on the mower frame housing and a portion on the base frame bight, said portions being additionally interlockable to hold said frames against relative lateral movement when said stop elements are interengaged.

10. The invention defined in claim 7, in which: the means connecting the base frame to the draft links includes a pair of transverse pintles respectively at the rear ends of the draft links and supporting part of the base frame and a pair of forward connectors at the front ends of the base frame legs and respectively engaging the draft links to sustain the remainder of the base frame.

11. A mower attachment for a tractor having lower hitch means and an upper connecting portion above said hitch means, comprising: a fore-and-aft carrier having a front end adjacent to the hitch means and a rear end spaced from the hitch means; means pivotally connecting the front end of the carrier to the hitch means on a first transverse pivot for vertical movement of said carrier; a mower frame disposed adjacent to the rear end of the carrier and having a mast rising rigidly therefrom and also having rigidly thereon a forwardly projecting arm means including a free front end portion laterally adjacent to the carrier and rearwardly of the first pivot; means pivotally connecting the front end portion of the arm means to the carrier on a transverse second pivot rearwardly spaced from the first pivot so that vertical movement of the carrier causes vertical movement of the front end portion of the arm means; fore-and-aft link means pivotally connected at its rear end to the mast on a third transverse pivot and pivotally connected at its front end to the upper connecting portion on the tractor on a fourth transverse pivot whereby the mower frame is moved vertically by vertical movement of the carrier but moves at a slower rate and through a smaller range than the carrier; cutting mechanism connected to the mower frame for vertical movement relative to said frame; and means interconnecting the cutting mechanism and the carrier and utilizing the aforesaid differences in rate and range to effect vertical movement of the cutting mechanism relative to the frame.

12. A mower attachment for a tractor having lower hitch means and an upper connecting portion above said hitch means, comprising: a U-shaped base frame having fore-and-aft laterally spaced apart legs, including free front ends adjacent to the hitch means, and a transverse rear bight cross-connecting the legs; means pivotally connecting the front ends of the legs to the hitch means on a first transverse pivot for vertical movement of said base frame; a mower housing disposed just ahead of the bight and laterally intermediate the legs, said housing having a central mast rising rigidly therefrom and also having rigidly thereon a pair of laterally spaced arms diverging forwardly to free front ends respectively laterally adjacent to the base frame legs and rearwardly of the first pivot; means pivotally connecting the front ends of the arms to the legs on a transverse second pivot rearwardly spaced from the first pivot so that vertical movement of the base frame causes vertical movement of the front ends of the arms; fore-and-aft link means pivotally connected at its rear end to the top of the mast on a third transverse pivot and pivotally connected at its front end to the upper connecting portion on the tractor on a fourth transverse pivot whereby the mower housing is moved vertically by vertical movement of the base frame but moves at a slower rate and through a smaller range than the base frame; cutting mechanism connected to the mower housing for vertical movement relative to said housing; and means interconnecting the cutting mechanism and the base frame and utilizing the aforesaid differences in rate and range to effect vertical movement of the cutting mechanism relative to the housing.

13. The invention defined in claim 12, in which: the base frame and mower housing respectively include stops interengageable upon predetermined downward movement of said frame and housing to interlock and thus to prevent further downward movement.

14. The invention defined in claim 13, in which: the housing stop includes a rigid central housing part projecting toward the bight; and the base frame stop comprises a loop secured to the bight and arranged to engage the central housing part to achieve said interlock.

15. For a tractor having a vertically movable hitch and lift structure of generally parallelogram nature including an upper lift arm pivoted to the tractor on a transverse axis, a lower draft link pivoted at its front end to the tractor on a transverse axis below the arm pivot, and a lift link pivotally connected at its upper end to the rear end of the arm and pivotally connected at its lower end to the draft link rearwardly of the draft link-to-tractor pivot: an implement attachment having a frame including a front end portion having means pivotally connecting and supporting the same on the draft link on a transverse pivot in closely offset relation to the draft link-to-tractor pivot so that the front end of the frame partakes of the vertical movement of the hitch and lift structure, said frame extending rearwardly and having a rear portion rearwardly remote from the frame-to-link pivot, said frame having mast means rigid thereon and affording a connecting portion above the general level of the draft link and rearwardly of the tractor; and a fore-and-aft control link pivotally connected at its rear end on a transverse pivot to the mast means connecting portion and also pivotally connected at its front end to the tractor on a transverse pivot above the draft link-to-tractor pivot so that the frame moves bodily vertically in response to vertical movement of the hitch and lift structure but at a different rate and through a different range than said structure.

16. The invention defined in claim 15, including: an implement member carried by the frame for adjustment relative to the frame; and means interconnecting said member and the hitch and lift structure and utilizing the aforesaid differences in rate and range to adjust said member relative to the frame in response to vertical movement of said structure.

17. For a tractor having fore-and-aft hitch and lift structure vertically movable through a defined range and at a certain rate: an implement frame relatively vertically movably sustained by said structure for vertical movement susbatntially simultaneously with and in response to vertical movement of said structure but through a smaller range and lower rate than said structure range and rate; an implement member connected to the frame for adjustment relative to said frame; and means interconnecting the structure and the member and utilizing the greater range and higher rate of vertical movement of said structure to adjust the member relative to the frame.

18. A power attachment for a tractor having a lift device, comprising: a carrier; means connecting the carrier to the tractor for relative vertical movement; means connecting the carrier to the lift device to vertically move the former by the latter through a defined range and at a certain rate; a mower frame; means connecting the mower frame to the carrier and to the tractor for vertical movement of said frame substantially simultaneously with and in response to vertical movement of the carrier but through a smaller range and lower rate than the carrier; cutting mechanism carried by the mower frame for vertical adjustment relative to the mower frame; and means interconnecting the cutting mechanism and the carrier and utilizing motion of the carrier through its greater range and higher rate to adjust the cutting mechanism vertically relative to the mower frame.

19. An implement attachment for a mobile support having a lift device and hitch means below said device, comprising: a fore-and-aft carrier having a front end pivotally connected to the hitch means on a first transverse pivot and further having a rear end; means connecting the carrier and the lift device for raising and lowering of the carrier by the device; and implement having a front end portion pivotally connected to the carrier on a second transverse pivot eccentric to the first pivot whereby the front end of said implement is movable with the carrier, said implement having an upper rear connecting portion rigidly related to the aforesaid front end portion and disposed rearwardly of and at a level above the second pivot; means carried by the mobile support and affording an upper front connecting portion; and fore-and-aft link means pivotally connected to said upper rear connecting portion on a third transverse pivot and pivotally connected to the mobile-support-carried front connecting portion on a fourth transverse pivot ahead of the third pivot and above the second pivot whereby the implement is moved by the carrier but through a range and at a rate different from that of said supporting part.

20. An implement attachment for a mobile support having a lift device and hitch means below said device comprising: a fore-and-aft carrier having a front end pivotally connected to the hitch means on a first transverse pivot and further having a rear end; means connecting the carrier and the lift device for raising and lowering of the carrier by the device; an implement frame affording a rigid L having fore-and-aft arm means and upright arm means, said fore-and-aft arm means having a front end portion adjacent to the mobile support; means connecting said front end portion to the mobile support; said upright arm means having an upper end portion providing an upper rear connecting portion rearwardly of and at a level above the front end portion of said fore-and-aft arm means; means carried by the mobile support and affording an upper front connecting portion; and fore-and-aft link means pivotally connected to said upper rear connecting portion and connected also to the mobile-support-carried front connecting portion, whereby the carrier is movable vertically by the lift device through a greater range and at a greater rate than said implement frame.

21. The invention defined in claim 20, including: an implement member carried by the implement frame for movement relative to said implement frame; and means connected to the implement member and operative in response to raising of the carrier and utilizing the aforesaid differences in range and rate to move the member relative to the implement frame.

22. An implement attachment for a mobile support having hitch means and a lift device above the hitch means and including a transverse rockshaft and a lift arm secured thereto, comprising: a fore-and-aft carrier pivotally connected to the hitch means on a first transverse pivot and having a rear end portion spaced from said pivot; an implement frame affording rigid L having a fore-and-aft arm means and upright arm means, said fore-and-aft arm means having a front end portion pivotally connected to the carrier on a second transverse pivot eccentric to the first whereby the front end of said implement frame is movable with the carrier, said upright arm means having an upper end portion providing an upper rear connecting portion rearwardly of the lift arm and above the rear end of the carrier; means on the lift arm providing an upper front connecting portion; and fore-and-aft link means pivotally connected to said upper rear connecting portion on a third transverse pivot and pivotally connected to the mobile-support-carried front connecting portion on a fourth transverse pivot ahead of the third pivot and above the second pivot whereby the implement frame is moved by the carrier but through a different range and at a different rate than said supporting part.

23. For a tractor having a vertically movable hitch and lift structure of generally parallelogram nature including an upper lift arm pivoted to the tractor on a transverse axis, a lower draft link pivoted at its front end to the tractor on a transverse axis below the arm pivot, and a lift link pivotally connected at its upper end to the rear end of the arm and pivotally connected at its lower end to the draft link rearwardly of the draft link-to-tractor pivot: an implement attachment having a frame including a front end portion having means pivotally connecting and supporting the same on the draft link on a transverse pivot in closely offset relation to the draft link-to-tractor pivot so that the front end of the frame partakes of the vertical movement of the hitch and lift structure, said frame extending rearwardly and having a rear portion rearwardly remote from the frame-to-link pivot, said frame having mast means rigid thereon and affording a connecting portion above the general level of the draft link and rearwardly of the tractor; and a fore-and-aft control link pivotally connected at its rear end on a transverse pivot to the mast means connecting portion and also pivotally connected at its front end to the tractor on a transverse pivot above the draft link-to-tractor pivot so that the frame moves bodily in response to vertical movement of the hitch and lift structure but at a different rate and through a different range than said structure.

References Cited in the file of this patent

UNITED STATES PATENTS 2,787,879  Johnson _______________ Apr. 9, 1957